US011577354B2

(12) United States Patent
Araki

(10) Patent No.: US 11,577,354 B2
(45) Date of Patent: Feb. 14, 2023

(54) METHOD FOR MANUFACTURING CARD CLOTHING

(71) Applicant: Araki Manufacturing Co., Ltd., Hyogo (JP)

(72) Inventor: Hideki Araki, Hyogo (JP)

(73) Assignee: Araki Manufacturing Co., Ltd., Hyogo (JP)

( * ) Notice: Subject to any disclaimer, the term of this patent is extended or adjusted under 35 U.S.C. 154(b) by 967 days.

(21) Appl. No.: 16/344,245

(22) PCT Filed: Oct. 2, 2017

(86) PCT No.: PCT/JP2017/035831
§ 371 (c)(1),
(2) Date: Apr. 23, 2019

(87) PCT Pub. No.: WO2018/096791
PCT Pub. Date: May 31, 2018

(65) Prior Publication Data
US 2019/0262964 A1 Aug. 29, 2019

(30) Foreign Application Priority Data

Nov. 25, 2016 (JP) .............................. JP2016-229557

(51) Int. Cl.
*B24B 19/18* (2006.01)
*D01G 15/84* (2006.01)
*D01G 15/86* (2006.01)

(52) U.S. Cl.
CPC ............ *B24B 19/18* (2013.01); *D01G 15/84* (2013.01); *D01G 15/86* (2013.01)

(58) Field of Classification Search
CPC ......... D01G 15/84; D01G 15/86; B24B 19/18
See application file for complete search history.

(56) References Cited

U.S. PATENT DOCUMENTS 2,849,844 A * 9/1958 Snape, Jr. ............... B24B 19/18
451/547
3,528,205 A * 9/1970 Roberts ................... B24B 19/18
451/417
(Continued)

FOREIGN PATENT DOCUMENTS

CN 2714246 Y 8/2005
DE 14509 C 7/1881
(Continued)

OTHER PUBLICATIONS

English Translation of International Search Report from PCT/JP2017/035831 dated Dec. 5, 2017 (1 page).
(Continued)

*Primary Examiner* — Shaun R Hurley
(74) *Attorney, Agent, or Firm* — Calfee Halter & Griswold LLP

(57) ABSTRACT

By removing burrs of the pin of the card clothing used in the slicker brush, and by giving a rounded distal ends, the feeling of use and safety of the slicker brush are improved, and removal of hair after use is facilitated. The method includes: a first process of implanting a plurality of pins made of metal wire on a base clothing to produce a card clothing; and a second process of polishing each pin of the card clothing, using a polishing material having flexibility and elasticity, in which in the second process, polishing is performed by rubbing, while pressing the polishing material against each of the pins, thereby manufacturing a card clothing having a rounded distal ends with no burr.

5 Claims, 6 Drawing Sheets

(56) References Cited

U.S. PATENT DOCUMENTS

| | | | | |
|---|---|---|---|---|
| 3,788,789 | A * | 1/1974 | Matsumura | B29C 48/914 264/39 |
| 5,989,110 | A * | 11/1999 | Leifeld | B24B 19/18 241/166 |
| 6,070,302 | A * | 6/2000 | Graf | D01G 15/84 19/98 |
| 6,129,614 | A * | 10/2000 | Faas | B24B 19/18 451/184 |
| 6,431,969 | B1 * | 8/2002 | Sauter | B24B 47/22 451/184 |
| 6,475,630 | B1 * | 11/2002 | Uesugi | B41N 3/04 101/454 |
| 6,508,698 | B1 * | 1/2003 | Faas | B24D 13/02 451/526 |
| 7,037,181 | B1 * | 5/2006 | Faas | D01G 15/38 451/184 |
| 7,234,997 | B2 * | 6/2007 | Faas | B24B 3/60 451/6 |
| 2014/0020211 | A1 * | 1/2014 | Steinbach | D01G 15/86 19/114 |
| 2016/0273138 | A1 * | 9/2016 | Artzt | D04C 1/06 |

FOREIGN PATENT DOCUMENTS

| | | | |
|---|---|---|---|
| EP | 1329288 A2 | 7/2003 | |
| EP | 1411157 A1 * | 4/2004 | ............ D01G 15/84 |
| JP | 49-12490 | 5/1972 | |
| JP | 63-182850 U1 | 11/1988 | |
| JP | S63-295169 A | 12/1988 | |
| JP | 7-40778 | 2/1995 | |
| JP | 11-158739 | 6/1999 | |
| JP | 3825124 B2 | 9/2006 | |
| JP | 54-38682 | 3/2014 | |

OTHER PUBLICATIONS

Extended European Search Report of EP17874524.6 dated Jun. 9, 2020 (seven pages).
Office Action from Chinese Application No. 2017800723233 dated Dec. 2, 2021 (34 pages).
"Modern abrasive belt grinding technology and engineering applications" Huang Yun, Chongqing University Press, Jun. 30, 2009, p. 35 (7 pages with English Abstract).
"Plywood Production Manual" H. B. Kachalin, China Forestry Press, Dec. 31, 1989, pp. 280-281 (7 pages with English Abstract).

* cited by examiner

METHOD FOR MANUFACTURING CARD CLOTHING

CROSS-REFERENCE TO RELATED APPLICATIONS

This application is a 371 of PCT Application No. PCT/JP2017/035831 filed on Oct. 2, 2017, which claims priority to Japanese Application No. 2016-229557 filed on Nov. 25, 2016, the contents of which are hereby incorporated by reference as if recited in their entirety.

TECHNICAL FIELD

The present invention relates to a method for manufacturing card clothing which is used mainly for an animal slicker brush and in which the burrs of pins are removed and the distal ends are rounded.

BACKGROUND ART

The card clothing is obtained by implanting a plurality of pins made by cutting a metal wire on a base clothing, and was used for carding in a spinning industry (a working of aligning a direction of fibers and removing dust) or a brush used for trimming of animals. In particular, the card clothing used for carding has been manufactured by an automatic machine for about 100 years. As an animal brush, it has been manufactured for more than 40 years by changing materials and specifications of pins and base clothing. This brush is called a slicker brush.

In the process of manufacturing the card clothing, burrs always occur when cutting the metal wire used for the pin, and in the card clothing for spinning, when repeating the carding, the distal ends of the pins gradually wears. As a result, the spinning properties, the quality, and the working efficiency are degraded, and therefore, it is necessary to sharpen the distal ends of the pins.

Patent Document 1 discloses a carding device in which an elastic polishing material is mounted to a surface of a roller. An object of this device is to polish the distal ends of all the pins with the same strength and scrape them to an equal extent.

Further, Patent Document 2 discloses a card clothing polishing device in which a polishing head having a polishing element on the top is attached to a support element via a sliding body. The sliding body is connected to a drive motor. Further, the card clothing is pressed against the polishing element, and the sliding body is caused to reciprocate by the drive motor to perform polishing. An object of this device is to uniformly polish the distal ends of the pins.

Further, Patent Document 3 discloses an inter-pin polishing machine of a card clothing roll for spinning in which a double-sided sandpaper is attached to a cylindrical drum with a constant interval in accordance with a pitch between the pins of the card clothing. An object of the polishing machine is to polish the side surfaces of the pins and remove burrs by pressing the double-sided sandpaper between the pins.

CITATION LIST

Patent Document

Patent Document 1: JP 1999-158739 A
Patent Document 2: JP 3825124 B2
Patent Document 3: JP 1988-182850 Y

SUMMARY OF THE INVENTION

Problem to be Solved by the Invention

Here, since a case where the card clothing is used for carding is assumed, the object of the polishing means of the card clothing described in Patent Documents 1 to 3 is to sharpen the distal ends of the pins. Further, Patent Documents 1 and 2 do not disclose the removal of burrs.

In addition, the existing polishing means of the card clothing including the above-mentioned Patent Documents polishes flatly, using a hard polishing material.

By the way, in the manufacturing of the card clothing used for a slicker brush, it is necessary to three-dimensionally polish in order to remove burrs of the pin and to round the distal ends of the pins.

By removing the burrs of the pins and rounding the distal ends in this way, a smooth feeling of use can be obtained when the brush is used, damage to the skin of the animal can be prevented, and furthermore, it is also possible to easily perform the removal work of the entangled hair at the time of use.

Therefore, although it is necessary to use a polishing means different from the above-mentioned Patent Documents in order to manufacture the card clothing used for the slicker brush, a method for manufacturing the card clothing using such a polishing means has not been established yet even now after the lapse of 40 years or more.

Furthermore, unlike a regular brush for hair straightening, the object of the slicker brush is to perform a work expressed as a comb (brush) which sharpens the entangled hair and removes the pill by the distal ends of the pins getting into the entangled hair at an acute angle. Therefore, the accuracy and uniformity of the middle bending angle of the pins are important.

Also, the distal ends of the pins of the slicker brush must be on a flat surface. This is because the convex pin points unnecessarily irritate or hurt the skin of the animal, if there is unevenness in the pin tips.

Therefore, it is also essential to polish so as not to damage the shape of the pin.

The invention has been made in view of the above-mentioned circumstances, and an object thereof is to provide a method for manufacturing a card clothing, in the card clothing used for a slicker brush, in which the feeling of use and safety are improved, and removal of hair adhered to the card clothing after use is facilitated, by removing burrs of the pins without impairing the shape of the pins, and by giving a rounded distal ends.

Means for Solving Problem

In order to solve the above-mentioned subject, a method for manufacturing card clothing includes:
a first process of implanting a plurality of pins made of metal wire on a base clothing to produce a card clothing; and
a second process of polishing each pin of the card clothing, using a polishing material having flexibility and elasticity,
in which the second process includes a process of polishing by rubbing, while pressing the polishing material against each of the pins.

According to the invention, by polishing each pin with a polishing material having flexibility and elasticity, it is possible to perform three-dimensional polishing in which remove burrs in the vicinity of the distal ends and give a rounded distal ends, in such a manner as to wrap around the distal ends of each pin.

In a preferred embodiment of the invention, a non-woven fabric provided with polishing material particles is used as the polishing material. With such a configuration, due to the characteristics of the non-woven fabric, such as a tissue structure intertwined without weaving fibers, the flexibility of the fibers, the hardness by providing polishing particles, and the elasticity of the whole non-woven fabric, it is possible to perform three-dimensional polishing in which remove burrs in the vicinity of the distal ends of each pin and give a rounded distal ends, while preventing the scattering of polishing material or the entanglement of fibers to each pin.

In a preferred embodiment of the invention, a nylon non-woven fabric is used as the polishing material. With such a configuration, the strength of the non-woven fabric can be increased, the deterioration due to abrasion can be suppressed, and the non-woven fabric can be used for a long time.

In a preferred embodiment of the invention, the non-woven fabric is impregnated with polishing material particles to the inside. With such a configuration, the non-woven fabric has an autogenous effect, which makes it possible to always maintain a constant polishing performance.

In a preferred form of the invention, the first process has a process of implanting each pin into the base clothing of a band-like body, and a process of manufacturing the card clothing, by bending the distal ends of each pin at the same angle and in the same direction so that an inner side has an obtuse angle, and the second process has a process of moving the card clothing straight at a constant speed, and a process of rotating the non-woven fabric roller around which the non-woven fabric is wound, along a direction from a bent portion of each pin to the distal ends, while making contact with each pin of the card clothing to perform polishing.

With such a configuration, it is possible to make the polished state of each of the plurality of pins uniform, and it is possible to mass-produce the card clothing easily and automatically.

In a preferred embodiment of the invention, in the second process, the peripheral speed of the non-woven fabric roller may be $1\times10^4\pi$ to $3\times10^4\pi$ (mm/min), the time required for polishing may be 20 to 60 (s), and a rotational distance of the non-woven fabric roller required for polishing may be $1\times10^4\pi$ (mm) or more. With such a configuration, it is possible to perform three-dimensional polishing in which remove burrs and give a rounded distal ends with higher accuracy.

In a preferred embodiment of the invention, in the second process, a width of the non-woven fabric roller is wider than a width in a short direction of the base clothing of a band-like body. It is possible to arrange the card clothing and the non-woven fabric roller so that polishing of each pin is performed by moving the base clothing only in a single direction, and to simplify the manufacturing process.

Effect of the Invention

According to the invention, it is possible to provide a method for manufacturing a card clothing in which the feeling of use and safety are improved, and removal of hair adhered to the card clothing after use is facilitated, by removing burrs of the pins without impairing the shape of the pins, and by giving a rounded distal ends.

MODE(S) FOR CARRYING OUT THE INVENTION

Figure 1A:
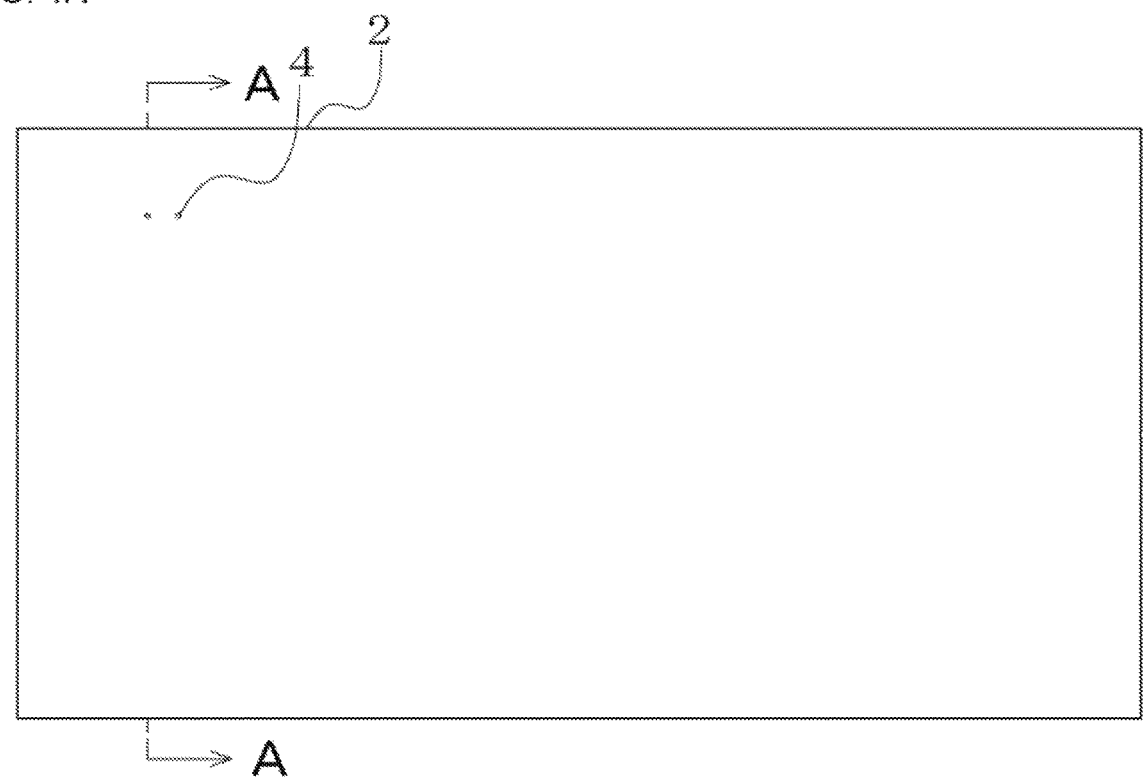
FIG. 1(a) is a top view.

Hereinafter, embodiments of the invention will be described in detail with reference to FIGS. 1 to 6.

In the present embodiment, the method for manufacturing the card clothing for removing burrs is divided into a first process and a second process. The first process is a pin implantation process which implants a pin 1 made of a metal wire cut and molded on a base clothing 2 by an automatic pin implantation device 5 to produce a card clothing 3. The second process is a process of polishing each pin 1 of the card clothing 3 manufactured by the first process.

21 First Process>

In the first process, the base clothing 2, which is the raw material, in the form of a band having a width of about 120 mm and a length of several tens of meters, and a metal wire in which a diameter is 0.26 mm and a cross section is a perfect circle, are accommodated in the automatic pin implantation device 5. The metal wire is a material of the pin 1, and stainless steel, steel or the like is suitably used. As the base clothing 2, one in which a surface layer 2a using a sheet of rubber, felt, sponge or the like and a base layer 2b using a cotton fabric, linen or the like are bonded is preferably. Further, in the present embodiment, the pin implantation in a width direction of the base clothing 2 is referred to as a row, and the pin implantation in a length direction is referred to as a stage.

Figure 1B:
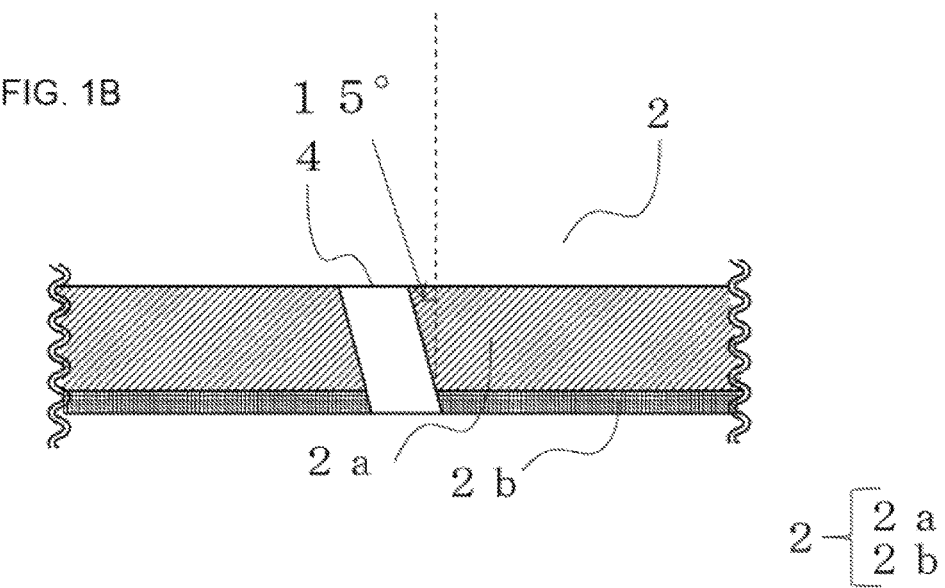
FIG. 1(b) is a partially enlarged cross-sectional view of an A-A cross section of a base clothing according to an embodiment of the invention.

First, a pin implantation hole 4 for implanting the pin 1 in the base clothing 2 is bored. As illustrated in FIG. 1(a), two pin implantation holes 4 are provided in parallel to a long side direction of the substantially rectangular base clothing 2 with an interval of the holes of 3 mm. Due to an installation angle of the base clothing 2 to the automatic pin implantation device 5, as illustrated in FIG. 1(b), each pin implantation hole 4 has an inclination of 15° with respect to a vertical line down to the pin implantation surface.

Next, the metal wire is cut into a predetermined length, and molded into a substantially U-shape to manufacture the pin 1. Then, both distal ends of the pin 1 are inserted into the above-described two pin implantation holes 4.

Figure 2A:
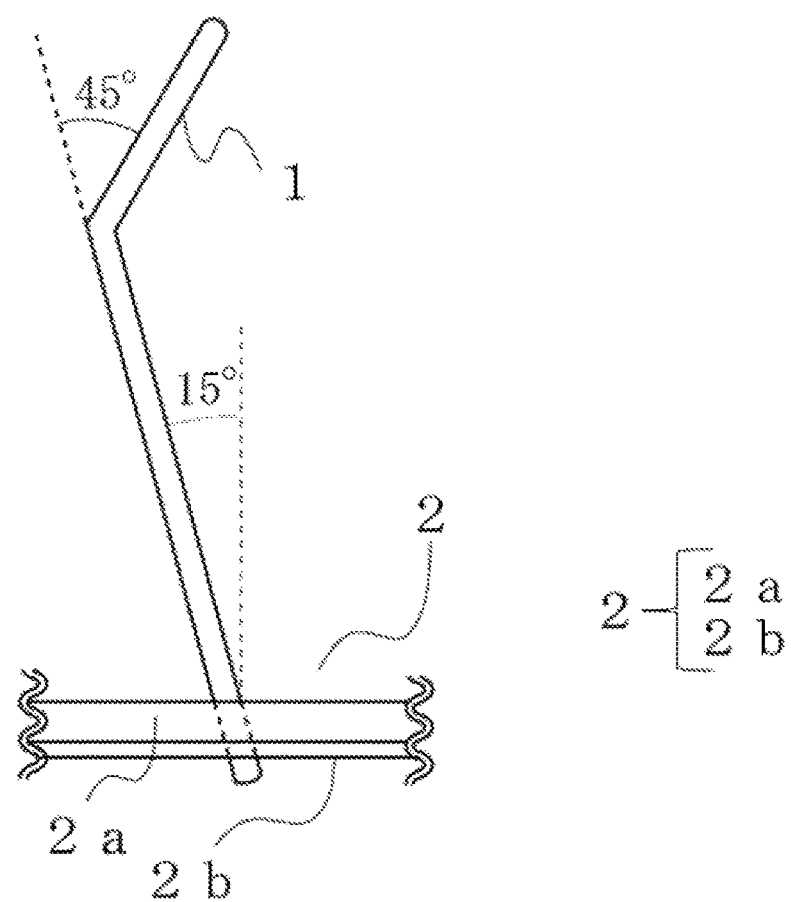
FIG. 2(a) is a side view.

Next, as illustrated in FIG. 2(a), both distal ends of the pin 1 are bent at a position about 5 mm from the distal ends. The bending angle is set to 45°. In this state, a distance from the base clothing 2 to the distal end of the pin 1 is about 15 mm.

Figure 3A:
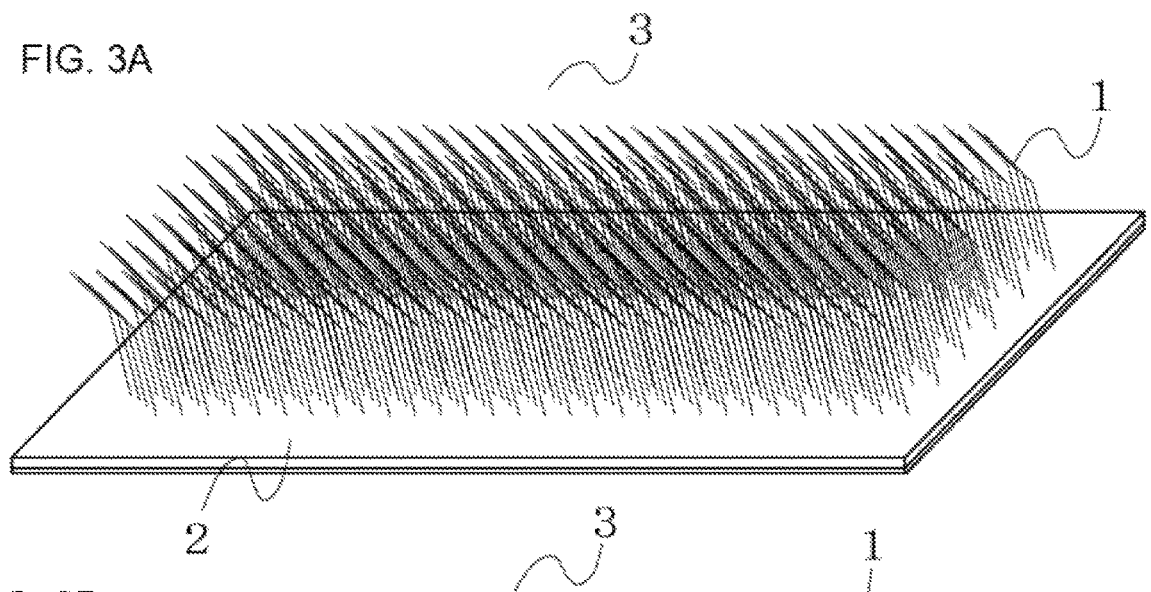
FIG. 3(a) is a perspective view.
Figure 3B:
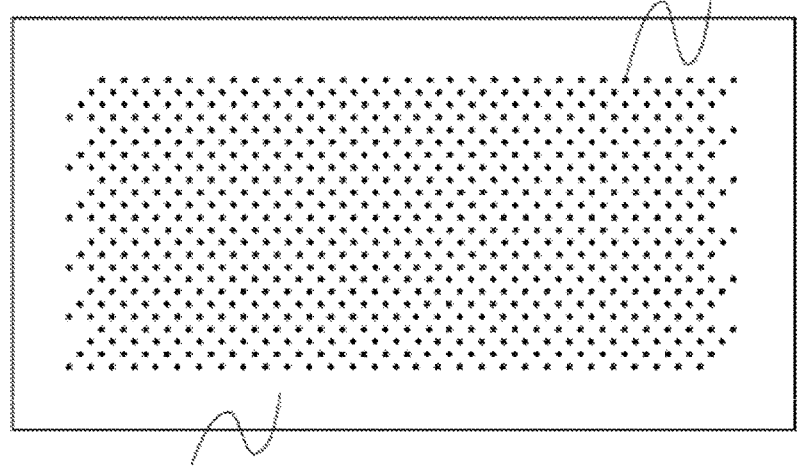
FIG. 3(b) is a top view and FIG. 3(c) is a bottom view of a card clothing according to the embodiment of the invention.
Figure 3C:
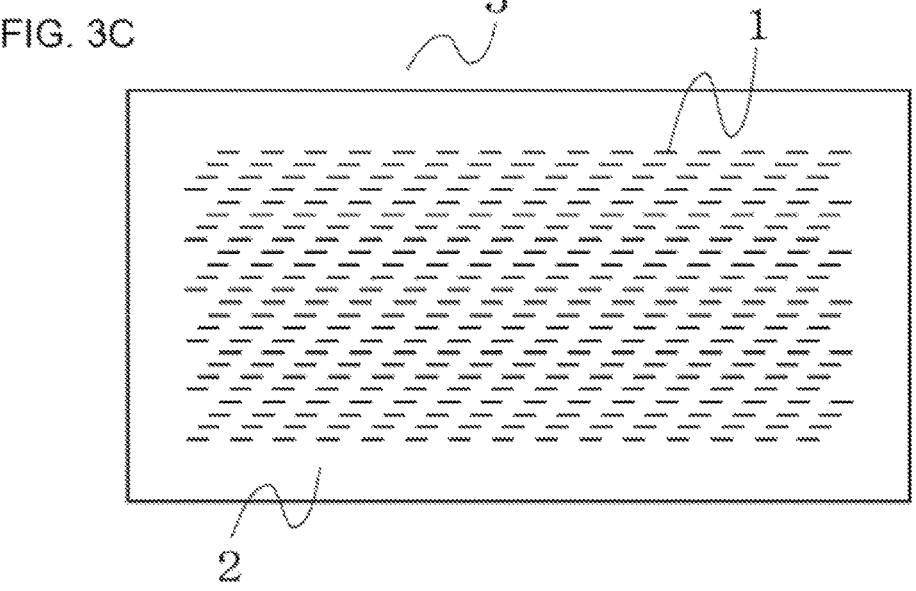

Furthermore, while shifting the pin implantation position by 3 mm, the pin implantation is repeated 15 times in the row direction. Above process is repeated 4 times in the stage direction. When the pin implantation of four stages is repeated six times in the stage direction, FIG. 3 is obtained. FIG. 3(b) is a top view of the card clothing 3, but the top from the root of the pin 1 is omitted.

Figure 4:
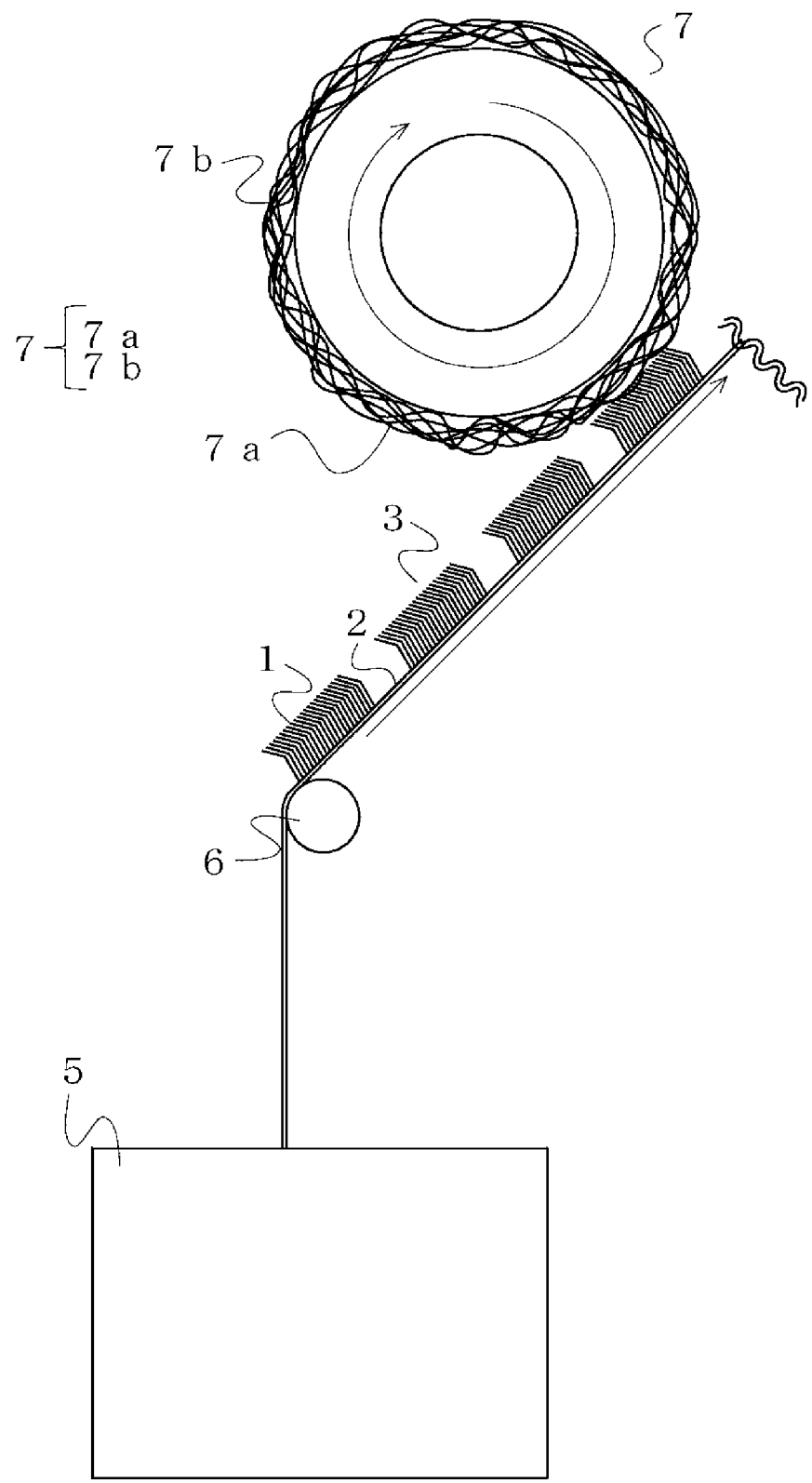
FIG. 4 is a schematic view of a method for manufacturing a card clothing for removing burrs according to the embodiment of the invention.

The automatic pin implantation device 5 illustrated in FIG. 4 performs the first process as described above fully automatically. As illustrated in FIG. 3, assuming that the card clothing 3 having the number of pins 1 (15×24) is one set, the automatic pin implantation device 5 continues to automatically perform the pin implantation on the base clothing 2, while spacing several cm apart for each set.

<Second Process>

As illustrated in FIG. 4, the card clothing 3 in which the pin implantation has been completed by the automatic pin implantation device 5 is delivered in the full length direction of the base clothing 2 at a speed of 45 (mm/min) by mechanical transport means 6 such as a drive roller. This speed is determined by the pin implantation speed of the automatic pin implantation device 5. The distal ends of each pin 1 are directed in an opposite direction to the transport direction.

Moreover, a non-woven fabric roller 7 in which a non-woven fabric 7b is wound around circumferential surface of cylindrical roller 7a as a polishing material having flexibility and elasticity is provided on the distal end side of the pin 1 of the card clothing 3 delivered after finishing the pin implantation, and polishing is performed by rotating the non-woven fabric roller 7 in the direction from the bent portions of each pin 1 to the distal end. A width of the non-woven fabric roller 7 is designed to be wider than a width in the short direction of the base clothing 2. The rotational speed and the installation position can be changed, and are changed to appropriate values in accordance with the standard of the pin 1, the delivery speed of the card clothing 3 and the like. Here, an example is given and demonstrated.

In FIG. 4, the non-woven fabric 7b of the non-woven fabric roller 7 is provided at a position where it touches the distal end 1 to 2 mm of each pin 1, and rotates at a speed of a peripheral velocity $2 \times 10^4 \pi$ (mm/min) in the direction from the bent portion of each pin 1 to the distal end. A diameter of the cylindrical roller 7a is 100 mm, and the thickness of the non-woven fabric 7b is about 10 mm. Therefore, the diameter of the non-woven fabric roller 7 becomes 120 mm.

The non-woven fabric 7b is made of nylon and impregnated with polishing material particles to the inside.

Figure 5:
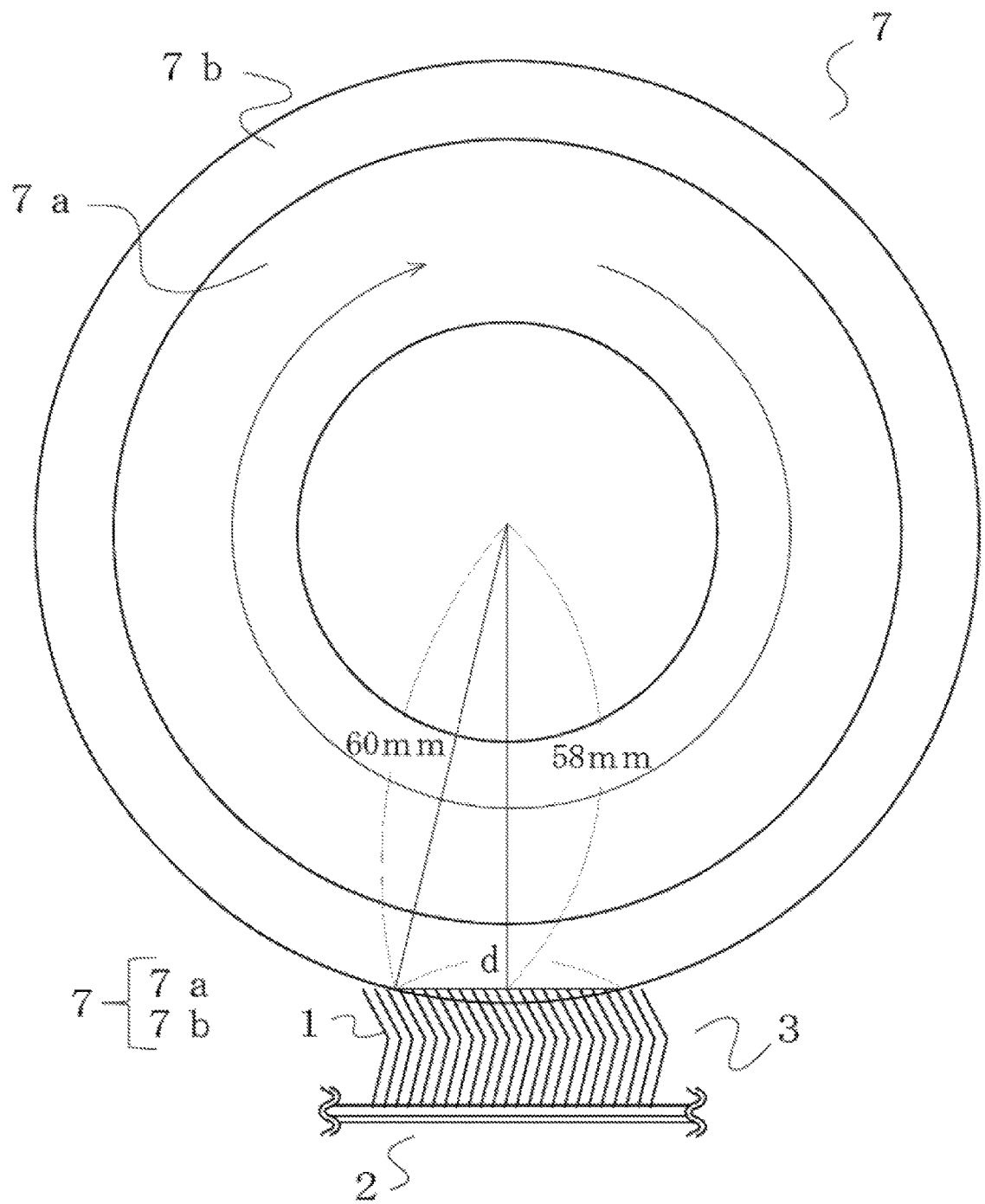
FIG. 5 is a partially enlarged view of the method for manufacturing the card clothing for removing burrs according to the embodiment of the invention.

FIG. 5 is a partially enlarged view of the card clothing 3 and the non-woven fabric roller 7 while the card clothing 3 is being polished in the second process. The non-woven fabric roller 7 is virtually assumed to be a perfect circle having a diameter of 120 mm for convenience of illustrating the following calculation process.

A moving distance of the card clothing 3 from the point at which the one pin 1 comes in contact with the non-woven fabric roller 7 and the polishing is started to the point at which the one pin 1 is separated from the non-woven fabric roller 7 and the polishing is completed is a line segment d in FIG. 5. When the distal ends of each pin 1 come to the middle point of this line segment d, it penetrates most deeply into the non-woven fabric 7b. Assuming that the depth is 2 mm, the length of the line segment d is $2 \times \sqrt{\{(60)^2 - (58)^2\}} \approx 30.7$ (mm) from the Pythagorean theorem. The time required to move this distance is 30.7 (mm)÷(45/60) (mm/s)≈40.9 (s). The rotation distance of the non-woven fabric roller 7 until polishing of one pin 1 is $\{40.9/60 \text{ (min)}\} \times \{2 \times 10^4 \pi \text{ (mm/min)}\} \approx 1.36 \times 10^4 \pi$ (mm).

Parameters such as shapes, dimensions, distances and speeds of the respective constituent members illustrated in the above-described embodiment are merely examples, and are not particularly limited. Mass production of the card clothing of uniform quality can be automated, by changing the pin implantation position and the pin implantation speed of the first process, and the work position and polishing speed of the second process, depending on the material or depending on the required card clothing standard.

Figure 2B:
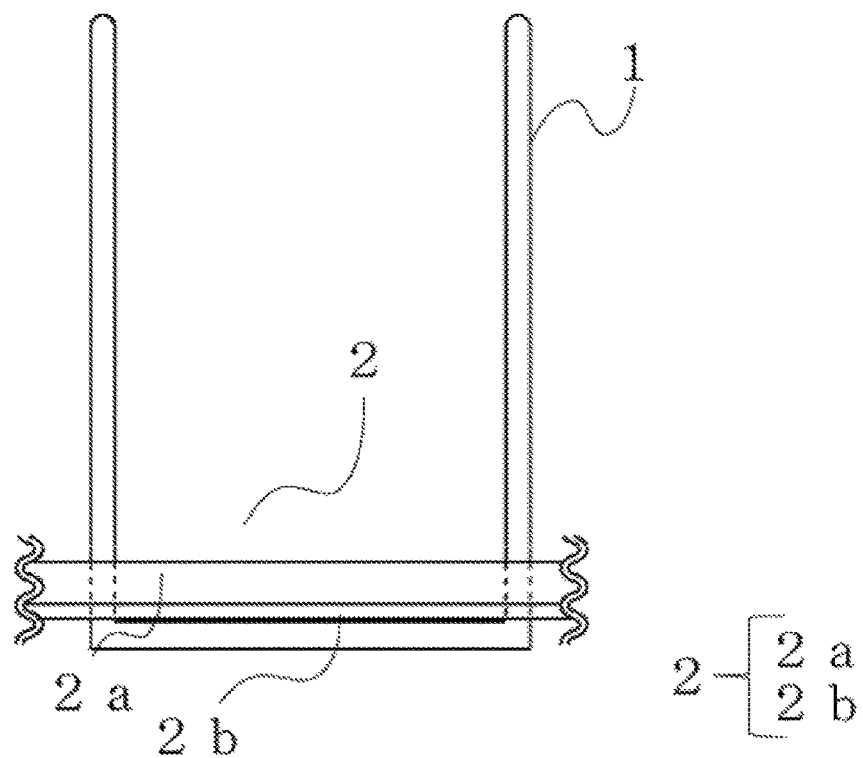
FIG. 2(b) is a front view of a pin inserted into a base clothing according to the embodiment of the invention.
Figure 6A:
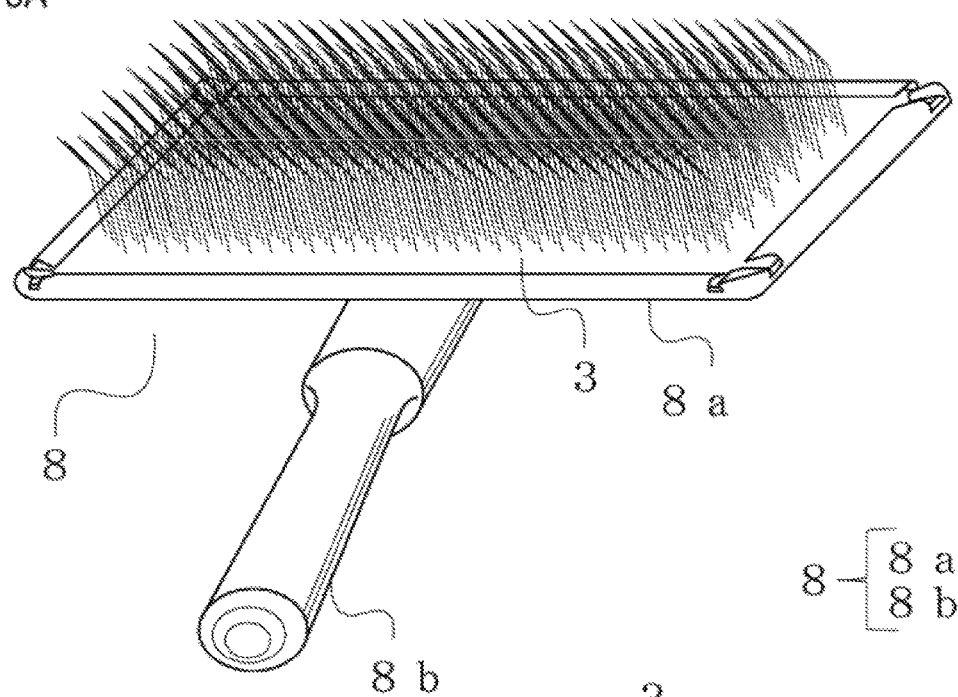
FIG. 6(a) is a perspective view.
Figure 6B:
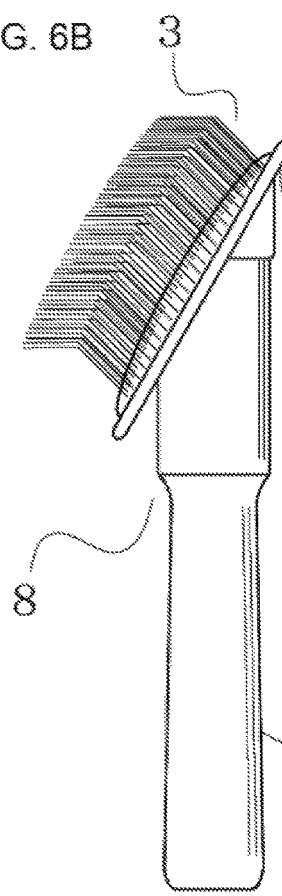
FIG. 6(b) is a side view.
Figure 6C:
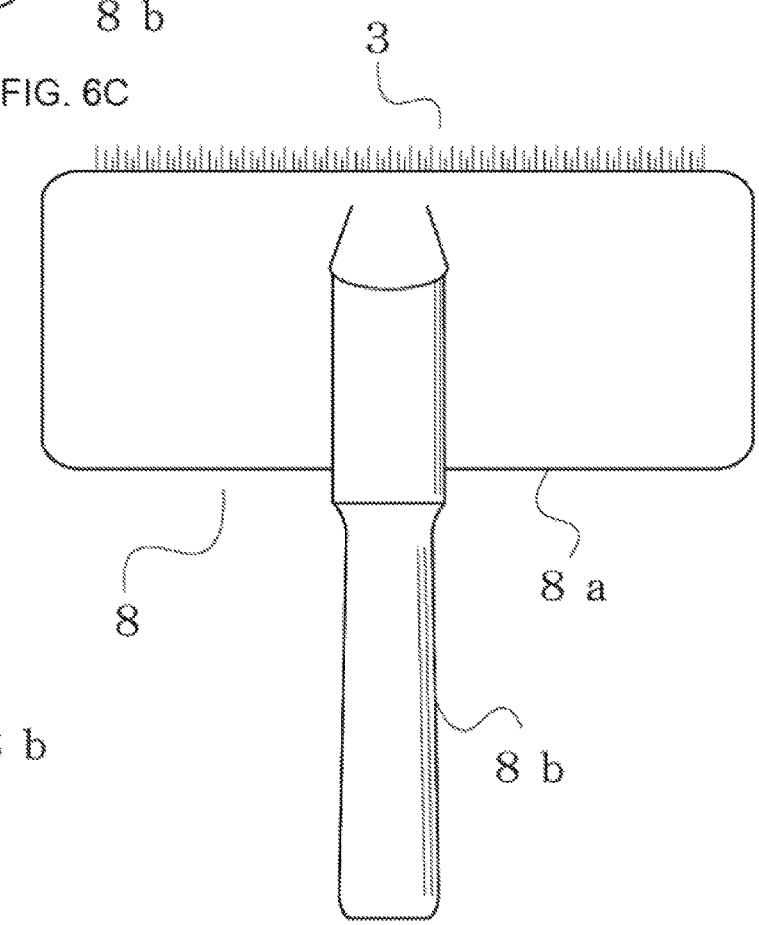
FIG. 6(c) is a rear view of a slicker brush according to the embodiment of the invention.

FIG. 6 is a view illustrating a usage example of using the card clothing 3, on which the second process is completed, as the slicker brush 8. First, as illustrated in FIGS. 1 and 2, the card clothing 3 on which the second process is completed is cut into a substantially rectangular shape for each set. Further, the cut card clothing 3 is placed on a plastically processable thin plate-like holding member 8a to which a handle member 8b is attached, and the four sides of the holding member 8a are bent to sandwich and fix the card clothing 3. Thus, it can be used as the slicker brush 8.

Since the slicker brush 8 uses the card clothing 3 subjected to the second process, it can realize smooth combing and a beautiful finish, and also suppresses irritation to the skin of the target animal, and can prevent damages to be imparted to the skin.

Furthermore, since it is possible to perform hair straightening by lightly pressing the pin tips on the skin of the animal, it contributes the health aspects of the animal such as blood circulation promotion due to the massage effect given to the skin and the reproduction prevention of bacteria due to removal of skin wastes. Although this point has conventionally been claimed in the slicker brush, in reality, because there is a risk that the distal ends of the pins may damage the skin, it is not used to press the pin tips on the animal, and it is an effect peculiar to the slicker brush 8 using the card clothing 3 according to the invention.

The invention achieves the following effects by carrying out the first process and the second process illustrated in the embodiment.

That is, as in the embodiment, by using the polishing material with flexibility and elasticity for the card clothing 3, it is possible to perform three-dimensional polishing in which remove burrs in the vicinity of the distal ends and give a rounded distal ends.

As the polishing material used to exhibit the above-mentioned effect, as long as it is a base material having flexibility and elasticity, materials other than a non-woven fabric may be used.

Further, by using the non-woven fabric 7b as a polishing material having flexibility and elasticity, due to the characteristics of the non-woven fabric 7b, such as a tissue structure intertwined without weaving fibers, the flexibility of the fibers, the hardness by providing polishing material particles, and the elasticity of the whole non-woven fabric, it is possible to perform three-dimensional polishing in which remove burrs in the vicinity of the distal ends of each pin and give a rounded distal ends, while preventing the scattering of polishing material or the entanglement of fibers to each pin 1.

In addition, parameters such as pin implantation position and speed, polishing position and speed, and time required for polishing are set to appropriate values depending on the material of the card clothing 3 and the product standard of the card clothing 3, and the first and second processes are automated to enable a mass production of the card clothing 3 having a uniform shape and a polished state of the pin 1.

Further, by using the non-woven fabric 7b of nylon, the strength of the non-woven fabric 7b can be enhanced, deterioration due to abrasion can be suppressed, and the non-woven fabric 7b can be used for a long time.

In addition, since the polishing material particles are impregnated to the inside of the non-woven fabric 7b, the non-woven fabric 7b has an autogenous function, making it possible to maintain a constant polishing performance at all times.

In addition, since the peripheral speed of the non-woven fabric roller 7 is set to $1\times10^4\pi$ to $3\times10^4\pi$ (mm/min), the time required for polishing is set to 20 to 60 (s), and the rotational distance of the non-woven fabric roller 7 required for polishing is set to $1\times10^4\pi$ (mm) or more, it is possible to perform three-dimensional polishing in which remove burrs in the vicinity of the distal ends and give a rounded distal ends with higher accuracy.

Further, by making the width of the non-woven fabric roller 7 wider than the width of the base clothing 2 in the short direction, it is possible to arrange the card clothing 3 and the non-woven fabric roller 7 so that polishing of each pin 1 is performed by moving the base clothing 2 only in a single direction, and to simplify the manufacturing process.

Explanations of Letters or Numerals

1 PIN
2 BASE CLOTHING
2a SURFACE LAYER
2b BASE LAYER
3 CARD CLOTHING
4 PIN IMPLANTATION HOLE
5 AUTOMATIC PIN IMPLANTATION DEVICE
6 MECHANICAL TRANSPORT MEANS
7 NON-WOVEN FABRIC ROLLER
7a CYLINDRICAL ROLLER
7b NON-WOVEN FABRIC
8 SLICKER BRUSH
8a HOLDING MEMBER
8b HANDLE MEMBER

The invention claimed is:

1. A method for manufacturing card clothing, the method comprising:
a first process of implanting a plurality of pins made of metal wire on a base clothing to produce a card clothing; and
a second process of polishing each pin of the card clothing, using a polishing material having flexibility and elasticity,
wherein the polishing material comprises a non-woven fabric provided with polishing material particles,
wherein the second process includes a process of polishing by rubbing, while pressing the polishing material against each of the pins and wrapping the polishing material around the distal ends of each pin to round the tip,
wherein the first process has a process of implanting each pin into the base clothing of a band-like body, and a process of manufacturing the card clothing, by bending the distal ends of each pin at the same angle and in the same direction so that an inner side has an obtuse angle, and
the second process has a process of moving the card clothing straight at a constant speed, and a process of rotating the non-woven fabric roller around which the non-woven fabric is wound, along a direction from a bent portion of each pin to the distal ends, while making contact with each pin of the card clothing to perform polishing,
wherein, in the second process, the peripheral speed of the non-woven fabric roller is $1\times10^4\pi$ to $3\times10^4\pi$(mm/min), the time required for polishing is 20 to 60 (s), and a rotational distance of the non-woven fabric roller required for polishing is $1\times10^4\pi$(mm) or more.

2. The method for manufacturing card clothing according to claim 1, wherein a nylon non-woven fabric is used as the polishing material.

3. The method for manufacturing card clothing according to claim 1, wherein the non-woven fabric is impregnated with polishing material particles to the inside.

4. The method for manufacturing card clothing according to claim 1, wherein, in the second process, a width of the non-woven fabric roller is wider than a width in a short direction of the base clothing of a band-like body.

5. The method for manufacturing card clothing according to claim 2, wherein the non-woven fabric is impregnated with polishing material particles to the inside.

* * * * *